(12) United States Patent
Bardsley et al.

(10) Patent No.: US 9,681,678 B2
(45) Date of Patent: Jun. 20, 2017

(54) FLAVOR COMPOSITION CONTAINING FLAVONE GLYCOSIDES

(75) Inventors: Kathryn Bardsley, Howell, NJ (US); Bryan Scott Delchamps, North Brunswick, NJ (US); Zhihua Liu, East Brunswick, NJ (US); Neelima Mannava, Manalapan, NJ (US); Hou Wu, East Brunswick, NJ (US)

(73) Assignee: INTERNATIONAL FLAVORS & FRAGRANCES INC., New York, NY (US)

( * ) Notice: Subject to any disclaimer, the term of this patent is extended or adjusted under 35 U.S.C. 154(b) by 1085 days.

(21) Appl. No.: 13/078,526

(22) Filed: Apr. 1, 2011

(65) Prior Publication Data

US 2012/0251465 A1     Oct. 4, 2012

(51) Int. Cl.
*A23L 27/20*     (2016.01)

(52) U.S. Cl.
CPC ................................ *A23L 27/2052* (2016.08)

(58) Field of Classification Search
CPC .................................................. A23L 27/2052
See application file for complete search history.

(56) References Cited

U.S. PATENT DOCUMENTS

| | | |
|---|---|---|
| 6,504,048 B1 | 1/2003 | Bachmann et al. |
| 6,838,106 B2 | 1/2005 | Kumamoto et al. |
| 2009/0054498 A1 | 2/2009 | Ahmad et al. |

FOREIGN PATENT DOCUMENTS

JP     2006340639 A  * 12/2006

OTHER PUBLICATIONS

Martinez-Vazquez et. al., Planta Medica, 1996, Georg Thieme Verlag Stuttgart, vol. 62, pp. 137-140.*
http://medical-dictionary.thefreedictionary.com/antipyretic.*
Lin, et al. "Identification of the phenolic components of chrysanthemum flower (*Chrysanthemum morifolium* Ramat)." Food Chemistry (2010) pp. 319-326 vol. 120(1).
Liu, et al. "Discrimination of different Chrysanthemums with Fourier transform infrared spectroscopy." Journal of Molecular Structure (2008) pp. 38-47 vol. 883-884.

* cited by examiner

*Primary Examiner* — Sarah Pihonak
(74) *Attorney, Agent, or Firm* — XuFan Tseng; Martin Chang; Elizabeth M. Stover

(57) ABSTRACT

The present invention has discovered that flavone glycosides represented by Formula I set forth below have unexpected and advantageous flavor enhancement and modification properties:

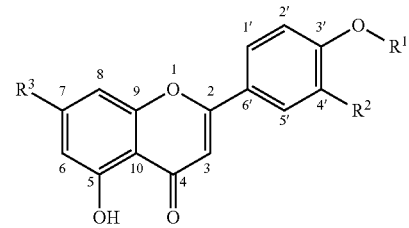

Formula I wherein $R^1$ is selected from the group consisting of H and $CH_3$, $R^2$ is selected from the group consisting of H and OH, and $R^3$ is a 7-O-glycoside. Thus, the flavone glycosides of the present invention can be used to enhance or modify the flavor of orally consumable compositions, such as foodstuff, chewing gums, dental and oral hygiene products, and medicinal products.

13 Claims, No Drawings

FLAVOR COMPOSITION CONTAINING FLAVONE GLYCOSIDES

FIELD OF THE INVENTION

The present invention relates to the use of flavone glycosides to enhance or modify the warming effect of orally consumable compositions, such as foodstuff, chewing gums, dental and oral hygiene products, and medicinal products.

BACKGROUND OF THE INVENTION

There is an ongoing need in the flavor industry to identify new flavor compounds such as warming compounds, which are known to provide a sensation of warmth. Previously reported warming compounds include 1'-acetoxychavicol acetate, 1'-acetoxyeugenol acetate derivative, polyhydric alcohols, *capsicum* powder, a *capsicum* tincture, *capsicum* extract, capsaicin, homocapsaicin, homodihydrocapsaicin, nonanoyl vanillyl amide, nonanoic acid vanillyl ether, vanillyl alcohol alkyl ether derivatives, such as vanillyl ethyl ether, vanillyl butyl ether, vanillyl pentyl ether, and vanillyl hexyl ether, isovanillyl alcohol alkyl ethers, ethylvanillyl alcohol alkyl ethers, veratryl alcohol derivatives, substituted benzyl alcohol derivatives, substituted benzyl alcohol alkyl ethers, vanillin propylene glycol acetal, ethylvanillin propylene glycol acetal, ginger extract, ginger oil, gingeol, gingeron, and black or white pepper extract [U.S. Pat. Nos. 6,504,048 and 6,838,106; U.S. Publication No. 2009/0054498]. However, these warming compounds may cause irritation when used in high amount, while exhibit short-duration effect or insufficient strength when used in low amount. There remains a challenge in developing novel warming compositions that provide long-lasting and strong warming effect in the absence of negative attributes such as irritation. Thus, there is a particular need to identify new warming enhancers that enhance or modify the warming flavor, preferably lower the levels of warming compounds in various food products to provide advantageous properties as well as economy of use.

SUMMARY OF THE INVENTION

The present invention has discovered that flavone glycosides represented by Formula I set forth below have unexpected and advantageous warming enhancement and modification properties:

Formula I

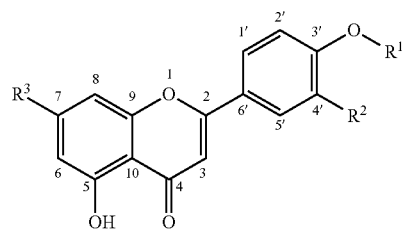

wherein $R^1$ is selected from the group consisting of H and $CH_3$, $R^2$ is selected from the group consisting of H and OH, and $R^3$ is a 7-O-glycoside.

One embodiment of the invention relates to a warming composition comprising a warming compound and a warming enhancer represented by Formula I provided above.

Another embodiment of the invention relates to a process of enhancing or modifying warming effect to a material selected from the group consisting of foodstuff, a chewing gum, a dental or oral hygiene product, and a medicinal product comprising the step of incorporating an effective amount of a warming compound and an olfactory effective amount of a warming enhancer of Formula I provided above.

These and other embodiments of the present invention will be apparent by reading the following specification.

DETAILED DESCRIPTION OF THE INVENTION

It is known to those with the skill in the art that Formula I as defined above provides compounds such as the following:

Formula II

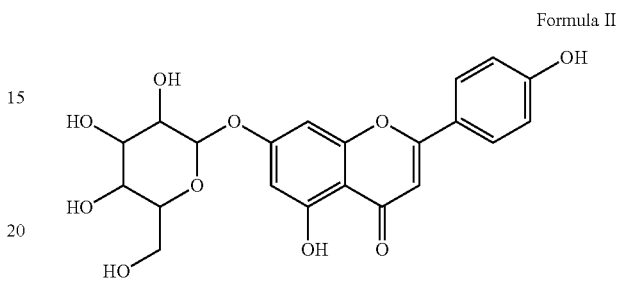

Formula III

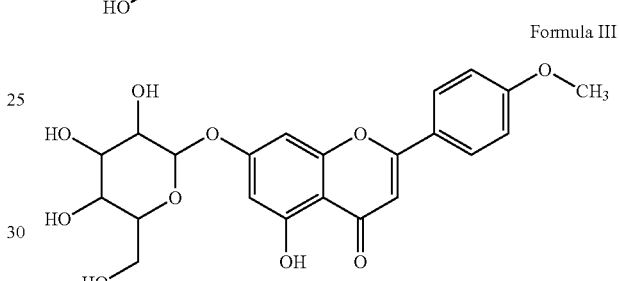

Formula IV

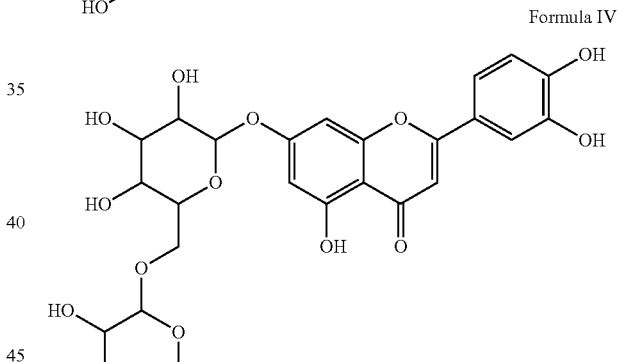

Formula V

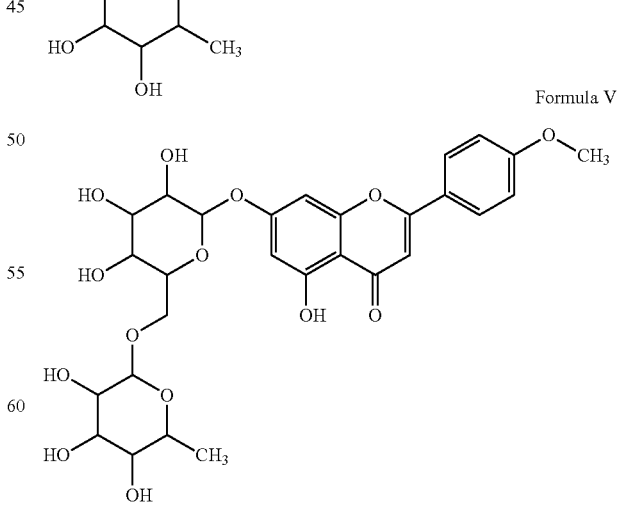

It is known to the skill in the art that
Formula II represents apigenin 7-O-glucoside;
Formula III represents acacetin 7-O-glucoside;

Formula IV represents luteolin 7-O-rutinoside; and
Formula V represents acacetin 7-O-rutinoside.

The compounds of the present invention can be obtained from natural plants such as, for example, but not limited to, *Bupleurum marginatum, Conyza sumatrensis, Fortunella margarita, Malabaila suaveolens, Solanum lyratum, Origanum syriacum, Chrysanthemum morifolium ramat, Olea europaea L., Teucrium zanonii, Cyclopia subternata, Caucalis platycarpos L., Reseda luteola L., Paeonia*section *Moutan, Catharanthus roseus, Saussurea medusa, Duabanga grandiflora, Agrimonia eupatoria L., Lawsonia inermis L., Ficus lyrata*, and *Celtis australis* [Lin, et al., Food Chemistry 120(1): 319-326 (2010); Liu, et al., Journal of Molecular Structure 883-884: 38-47 (2008)].

The compounds of the present invention are also generally commercially available. For example, apigenin 7-O-glucoside (Formula II) and acacetin 7-O-rutinoside (Formula V) can be obtained from INDOFINE Chemical Co., Inc. (United States), acacetin 7-O-glucoside (Formula III) can be obtained from Apin Chemicals Ltd. (United Kingdom), and luteolin 7-O-rutinoside (Formula IV) can be obtained from AnalytiCon Discovery GmbH (Germany).

The compounds of the present invention are surprisingly found to have unexpected properties of enhancing and modifying warming effect in flavors, which are demonstrated to be advantageous for augmenting or imparting taste enhancement or somatosensory effect in foodstuff, chewing gums, oral hygiene products, and medicinal products by providing flavor enhancement and a preferred overall flavor profile.

The compounds of the present invention can be used, alone or as a mixture, in combination with a warming compound or a mixture of warming compounds. For example, the compounds may be employed to enhance the perceived warming effect of *capsicum* extract since a large amount of *capsicum* extract may cause adverse effect such as irritation. In a preferred embodiment, the compounds are used in combination with *capsicum* extract such as *capsicum oleoresin* in a weight ratio of at least about 1:1000, preferably from about 100:1 to about 1:100, more preferably from about 20:1 to about 1:20, and even more preferably from about 5:1 to about 1:5.

As used herein, a warming compound is understood to mean a compound that provides warmth sensation. A warming enhancer is understood to mean a compound that enhances or modifies the warming effect of a warming compound.

The terms "flavor composition" and "flavor formulation" are understood to mean the same and refer to a formulation that is intended for providing a flavor character to foodstuff, medicinal products, and cosmetic products.

The terms "warming composition" and "warming formulation" are understood to mean the same and refer to a formulation that is intended for providing warming effect to foodstuff, medicinal products, and cosmetic products. The warming composition of the present invention is a composition comprising a warming enhancer of the present invention.

The term "enhancing" in the phrase "enhancing or modifying a warming formulation" is understood to mean making the warming formulation greater in effectiveness or providing the warming formulation with an improved warmth character. The term "modifying" is understood to mean raising the warming formulation to a more desirable character.

The phrase "an effective amount of a warming compound" is understood to mean that the amount of the warming compound is above the threshold for detection by humans and, therefore, capable of enhancement by the addition of the compounds of the present invention. As the taste perception can be subjective, this threshold necessarily varies from person to person even with the same warming compound and further with the nature and form of the products containing the warming compound.

As used herein, an olfactory effective amount is understood to mean the amount of the compound in a flavor composition that alters the characteristics of the composition, or enhances or modifies the flavor, taste, and aroma reaction contributed by another ingredient in the composition. The overall flavor, taste, and aroma effect of the composition will be the sum effect of all flavor ingredients. The olfactory effective amount will vary depending on many factors including other ingredients, their relative amounts, and the effect that is desired.

The usage level of the compounds of the present invention varies depending on the product in which the compounds are employed. Generally, the level of the compounds employed in a product is greater than about 1 part per billion by weight, preferably from about 10 parts per billion to about 100 parts per million by weight, more preferably from about 50 parts per billion to about 10 parts per million by weight.

As used herein, foodstuff includes both solid and liquid ingestible materials for man or animals, which materials usually do, but need not, have nutritional value. Thus, foodstuff includes food products, such as meats, gravies, soups, convenience foods, malt, alcoholic and other beverages, milk and dairy products, seafood, including fish, crustaceans, mollusks and the like, candies, vegetables, cereals, soft drinks, snacks, dog and cat foods, other veterinary products and the like.

When the compounds of the present invention are used in an orally consumable composition, they can be combined with conventional flavoring ingredients or adjuvants, which are well known in the art. Requirements of such flavoring ingredients and adjuvants are that: (1) they be organoleptically compatible with the compounds of the present invention whereby the flavor of the ultimate consumable composition to which the compounds are added is not detrimentally affected by the use of such flavoring ingredients and adjuvants; and (2) they be ingestible and thus nontoxic or otherwise non-deleterious. In addition, the orally consumable composition can broadly include other flavor materials, vehicles, stabilizers, thickeners, surface active agents, conditioners, and flavor intensifiers.

The following are provided as specific embodiments of the present invention. Other modifications of this invention will be readily apparent to those skilled in the art. Such modifications are understood to be within the scope of this invention. As used herein all percentages are weight percent unless otherwise noted, and ppm is understood to stand for parts per million.

EXAMPLE

The warming compositions of *capsicum oleoresin* (2 ppm) combined with apigenin 7-O-glucoside (Formula II), acacetin 7-O-glucoside (Formula III), luteolin 7-O-rutinoside (Formula IV), and acacetin 7-O-rutinoside (Formula V), respectively, were evaluated by a trained sensory panel using an intensity scale of 0 to 5, where 0=none, 1=minimal, 3=moderate, and 5=intense. *Capsicum oleoresin* (2 ppm) alone was used as the control. Sensory scores were reported in the following:

| Composition | Concentration (flavone glycoside) | Flavor Profile | Flavor Intensity |
| --- | --- | --- | --- |
| Capsicum oleoresin | 0 | | 2 |
| Capsicum oleoresin/ Formula II | 1 ppm | Quick onset, strong heat on the tip of tongue | 2.5 |
| Capsicum oleoresin/ Formula III | 1 ppm | Some heat enhancement | 2.5 |
| Capsicum oleoresin/ Formula IV | 1 ppm | Heat enhancement, delayed | 2.5 |
| Capsicum oleoresin/ Formula V | 1 ppm | Strong heat, enhancement delayed, more delocalized | 3.5 |

As shown above, Formulas II, III, IV, and V all enhanced the warming effect of *capsicum oleoresin*.

What is claimed is:

1. A warming composition comprising a warming compound and a warming enhancer of Formula I:

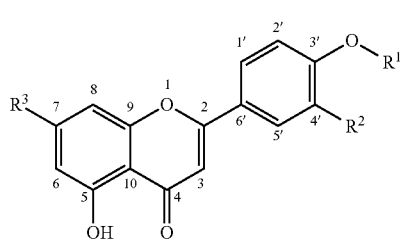

Formula I wherein $R^1$ is selected from the group consisting of $CH_3$; $R^2$ is selected from the group consisting of H; and $R^3$ represents 7-O-rutinoside.

2. The warming composition of claim 1 further incorporated into a material selected from the group consisting of foodstuff, a chewing gum, a dental or oral hygiene product, and a medicinal product.

3. The warming composition of claim 2, wherein the warming enhancer is provided at a level of greater than about 1 part per billion by weight.

4. The warming composition of claim 2, wherein the warming enhancer is provided at a level of from about 10 parts per billion to about 100 parts per million by weight.

5. The warming composition of claim 2, wherein the warming enhancer is provided at a level of from about 50 parts per billion to about 10 parts per million by weight.

6. The warming composition of claim 1, wherein the warming enhancer and the warming compound have a weight ratio of at least about 1:1000.

7. The warming composition of claim 1, wherein the warming enhancer and the warming compound have a weight ratio of from about 100:1 to about 1:100.

8. The warming composition of claim 1, wherein the warming enhancer and the warming compound have a weight ratio of from about 20:1 to about 1:20.

9. The warming composition of claim 1, wherein the warming enhancer and the warming compound have a weight ratio of from about 5:1 to about 1:5.

10. A warming composition comprising a warming compound and a warming enhancer, wherein the warming enhancer is selected from the group consisting of:
acacetin 7-O-rutinoside.

11. The warming composition of claim 1, wherein the warming compound is selected from the group consisting of *capsicum* extract, black or white pepper extract, ginger extract, vanillyl butyl ether, and a mixture thereof.

12. A process of enhancing or modifying warming effect to a material selected from the group consisting of foodstuff, a chewing gum, a dental or oral hygiene product, and a medicinal product comprising the step of incorporating an effective amount of a warming compound and an olfactory effective amount of a warming enhancer of Formula I:

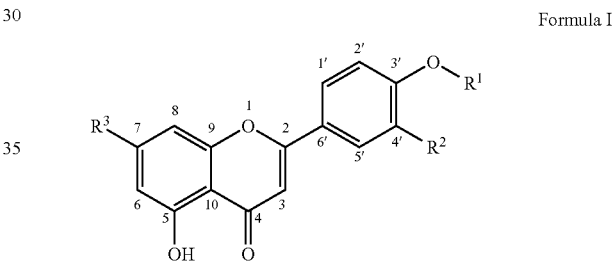

Formula I wherein $R^1$ is selected from the group consisting of $CH_3$; $R^2$ is selected from the group consisting of H; and $R^3$ represents a 7-O-rutinoside.

13. The process of claim 12, wherein the warming compound is selected from the group consisting of *capsicum* extract, black or white pepper extract, ginger extract, vanillyl butyl ether, and a mixture thereof.

* * * * *